United States Patent
Sumida

(10) Patent No.: US 6,712,623 B2
(45) Date of Patent: Mar. 30, 2004

(54) JUNCTION BOX

(75) Inventor: Tatsuya Sumida, Yokkaichi (JP)

(73) Assignee: Sumitomo Wiring Systems, Ltd., Yokkaichi (JP)

(*) Notice: Subject to any disclaimer, the term of this patent is extended or adjusted under 35 U.S.C. 154(b) by 0 days.

(21) Appl. No.: 10/103,767

(22) Filed: Mar. 25, 2002

(65) Prior Publication Data

US 2002/0137368 A1 Sep. 26, 2002

(30) Foreign Application Priority Data

Mar. 26, 2001 (JP) ........................................ 2001-088812

(51) Int. Cl.[7] .............................................. H01R 12/00
(52) U.S. Cl. ...................... 439/76.2; 439/212; 439/949; 174/52.1
(58) Field of Search ................................. 439/76.2, 949, 439/752, 212, 709, 701; 174/49, 50, 52.1

(56) References Cited

U.S. PATENT DOCUMENTS

| | | | |
|---|---|---|---|
| 4,950,168 A | | 8/1990 | Watanabe et al. |
| 5,057,026 A | | 10/1991 | Sawai et al. |
| 5,067,905 A | | 11/1991 | Matsumoto et al. |
| 5,626,492 A | * | 5/1997 | Onizuka et al. ............. 439/949 |
| 5,763,827 A | * | 6/1998 | Sugiura ...................... 439/949 |
| 5,777,579 A | * | 7/1998 | Goetz et al. ................. 342/373 |
| 6,015,302 A | | 1/2000 | Butts et al. |
| 6,283,800 B2 | * | 9/2001 | Sasaki et al. ................ 439/752 |

FOREIGN PATENT DOCUMENTS

| | | |
|---|---|---|
| EP | 0240453 | 10/1987 |
| JP | 58-22033 | 7/1981 |
| JP | 62-19049 | 5/1987 |
| JP | 1-116514 | 8/1989 |
| JP | 1-162715 | 11/1989 |

* cited by examiner

*Primary Examiner*—Renee Luebke
*Assistant Examiner*—Felix O. Figueroa
(74) *Attorney, Agent, or Firm*—Greenblum & Bernstein, P.L.C.

(57) ABSTRACT

The present invention provides a junction box that is divided into a base circuit part connectable to an external circuit and fuse and/or relay connection circuit parts. The junction box includes a base module including the base circuit part, and a fuse module including the fuse connection circuit part and/or a relay module including the relay connection circuit, and the junction box is assembled by combining the modules. The base circuit part of the base module includes rectangular vertical bus bars that are aligned in parallel in an internal part of a case, and the case incorporates multiple terminal housing compartments into which terminals connectable to external wire terminals are inserted, each terminal incorporating pairs of grip ends of terminals that grip and connect to the vertical bus bars.

22 Claims, 16 Drawing Sheets

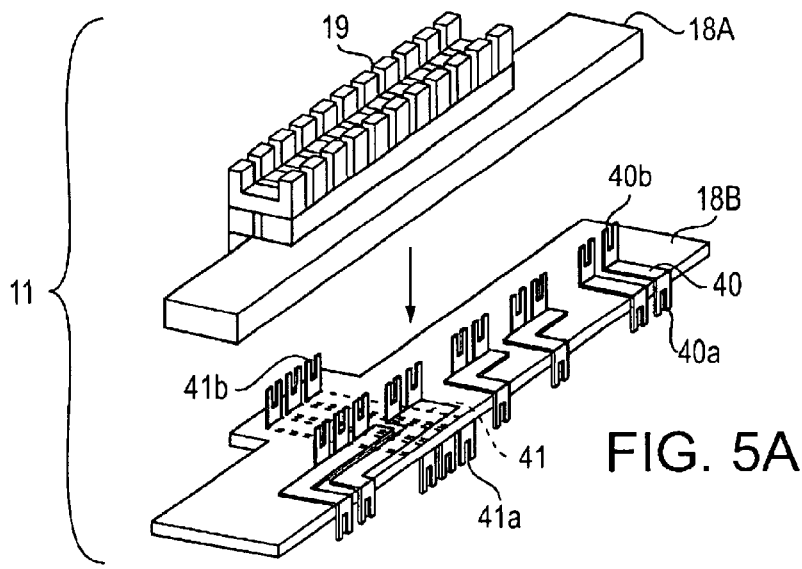
FIG. 5A
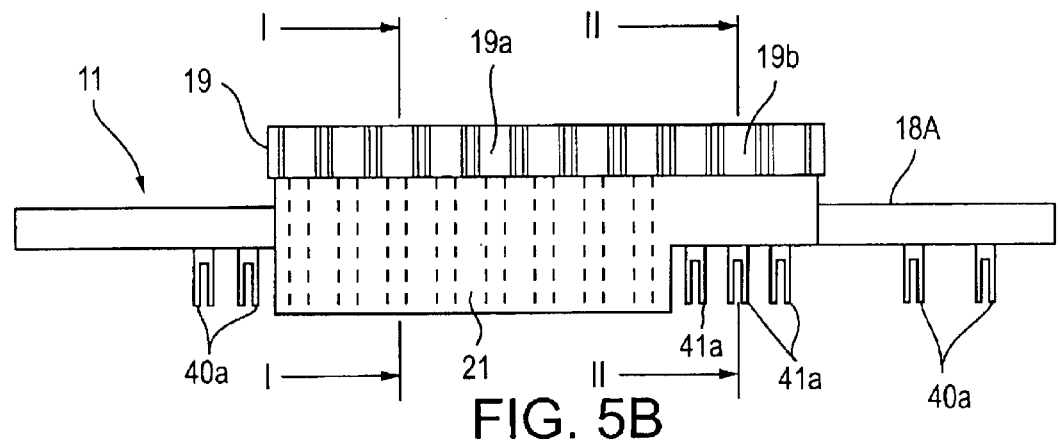
FIG. 5B
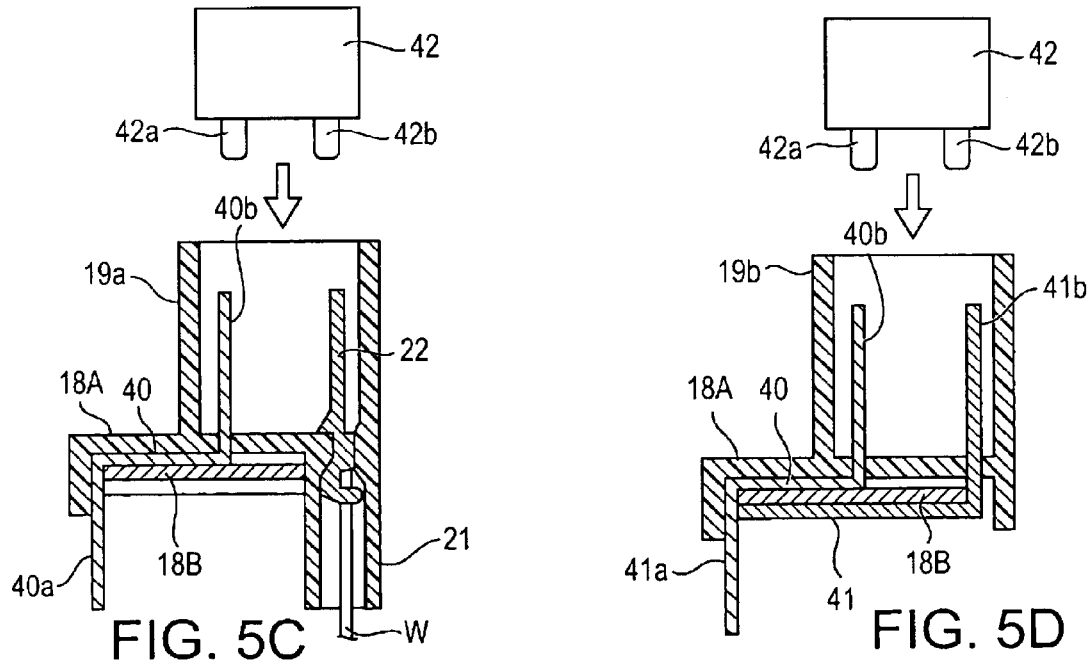
FIG. 5C
FIG. 5D

JUNCTION BOX

CROSS-REFERENCE TO RELATED APPLICATION

The present application claims priority under 35 U.S.C. §119 of Japanese Patent Application No. 2001-088812, filed on Mar. 26, 2001, the disclosure of which is expressly incorporated by reference herein in its entirety.

BACKGROUND OF THE INVENTION

1. Field of the Invention

This invention relates to an automobile junction box, in which the internal circuits utilize and share rectangular-shaped bus bars, and in which circuit changes are simplified.

2. Discussion of Background Information

In recent years, there has been a rapid increase in the number of automobile electrical equipments, and the number of circuits that are housed inside an automotive electrical connection boxes, especially junction boxes. Construction of such a high density of branch circuits requires numerous parts and a large amount of assembly time.

Among such automotive electrical connection boxes is junction box 1 of FIG. 15, for example, that has a multilayered configuration of bus bars 5A–5D with intervening insulating plates 4A–4E between upper case 2 and lower case 3. The above-mentioned upper case 2 includes connector receptacles 2a, relay housings 2b, and fuse housings 2c to which connectors 6, relays 7, and fuses 8 are respectively attached so that their terminals are directly connected to tabs protruding from the bus bars or via relay terminals. Lower case 3 also includes connector receptacles 3a that connect to protruding tabs 5a of the bus bars. Bus bars 5A–5D that are attached to above mentioned insulating plates 4A–4E are stamped out of conductive metal boards into required circuit patterns.

As shown in FIGS. 16(A) and (B), vertical bus bars 5' may also be housed inside upper case 2' (3'), instead of the above bus bars 5A–5D. The above vertical bus bars 5' are formed as ribbon-shaped conductive metal pieces formed to the required bent shapes.

In junction box 1 of FIG. 15, since the bus bars are stamped into circuit patterns, new bus bars must be manufactured if a change in the circuit is necessary. Therefore, the cost of dies to form the bus bars becomes very expensive as it becomes difficult to flexibly accommodate circuit changes. Also, the production yield for conductive metal boards is very poor, thus increasing the cost of manufacturing.

Using vertical bus bars 5' as shown in FIG. 16, will improve the yield for manufacturing the conductive metal boards, because the bus bars are ribbon-shaped. However, bus bars that are formed and bent need to be inserted one by one into slots inside a case or between protruding guides. Therefore, such manufacturing still requires time and increases the cost.

Additionally, both of the junction boxes in FIGS. 15 and 16 have a configuration in which connectors, fuses, and relays are connected to bus bars in the internal circuits. Therefore, when there is a specification change that changes the connections between the fuses and relays and internal circuit, it is necessary to change the entire internal circuit, and it has been very difficult to easily accommodate circuit changes.

Furthermore, in the junction box of FIG. 15, when installing connectors, relays or fuse housings in vertically opposing positions, tabs that bend from the bus bars will overlap and cannot be extended. As a result, such tabs need to be installed at bus bars of different layers, thus increasing the number of bus bar layers. Due to such an increase in the number of bus bar layers, the height of the junction box will also increase and thus will no longer be compact.

SUMMARY OF THE INVENTION

The present invention is provided in view of the above-described problems. The first object of the invention is to provide for bus bars made to have a high yield rate for use in a junction box housing, automatic assembly of the bars into a case in a single automatic operation, and simplified circuit modification. The second object of the invention is to provide module units that contain the circuits in a junction box so that in the event of a change in a circuit that is connected to external circuits, fuses, or relays, the change is only made to the corresponding circuit without the need to modify the other circuit.

To address the above-described problems, the present invention provides a junction box that is divided into a base circuit part connected to an external circuit, and a fuse and/or relay circuit connection part, that incorporates a base module including the base circuit part and a fuse module including the above fuse connection circuit part and/or a relay module including the relay connection circuit, and that is assembled by combining these modules. The base circuit part of the base module is configured with rectangular vertical bus bars aligned in parallel in an internal part of a case, wherein the case incorporates multiple terminal housing compartments into which terminals for connection to external wire terminals are inserted, the terminals incorporating pairs of terminal grip ends that grip and connect to the vertical bus bars.

As described above, the junction box, according to the present invention, incorporates a base module including a base circuit part connected to an external circuit of external wires, and employs rectangular vertical bus bars as a circuit body for the base module. Unlike conventional vertical bus bars that are formed by bending, the vertical bars of the present invention are used "as is" in rectangular shape and are aligned in parallel inside a case. Thus, it is possible to get a 100% yield from a conductive metal board omitting the forming process, and to automatically assemble the internal case by installing the vertical bars in one operation.

In addition, the internal circuit of the junction box is divided into a base circuit part that is connected to an external circuit, and a fuse and/or relay connection circuit part, and the junction box incorporates a base module including the base circuit part, and a fuse module including the fuse connection circuit and/or relay module including the relay connection circuit. Because the junction box is assembled with these modules, if there are any specification changes in the fuse and/or relay connection circuit parts, it is only necessary to change the corresponding fuse and/or relay modules, thus simplifying the process for such specification changes. Conversely, if changes only to the connection circuit with the external wires are required, it is only necessary to change connection positions of the wires that are connected to the vertical bus bars of the base module, thus also simplifying the process for such circuit changes.

A terminal stop part that stops the terminal is installed on the inner surface of the individual terminal housing that is installed in the case of the base module. It is preferable to align the terminal housings in parallel and to have a retainer insertion orifice in the case, so that the terminals inserted in these terminal housings are secured with overlapping stops.

By installing the double stop retainer, it is possible to prevent unplugging and to detect incomplete insertion of the terminals inside each terminal housing. Also, since the terminal housings are aligned in parallel, it is possible to automatically connect multiple wire terminals to vertical bus bars in one operation.

As described above, once all of the terminals from the external wires connected to the vertical bus bars inside the base module are inserted in the terminal housings, it is no longer necessary to have a conventional connection between the wire harness and junction box circuits. It also becomes possible to form a one-piece junction box and wire harness assembly that includes the above external wires.

The above terminal housing and/or connector receptacle are provided on both cases on the surfaces that oppose the aligned vertical bus bars, and both sides of the aligned vertical bus bars are gripped in the length direction and connected by the above wire end terminals. When a junction box is horizontally positioned, the vertical bus bars are housed inside the internal case that is formed by lower and upper cases of the base module. However, it is possible to install the terminal housing and/or connector receptacle only at the upper case side, and also to install the same at both upper and lower cases. Similarly, when a junction box is vertically positioned, vertical bus bars can be housed in the above terminal housing and/or connector receptacle on either one of bilaterally symmetrical vertical cases of a base module, or on both cases. When the terminal housing and/or connector receptacle that are connected to the external wires are installed at both sides of the cases that grip the vertical bus bars, and both sides of the vertical bus bars are connected to external wires, the external wires can form a spliced connection via the vertical bus bar.

The vertically aligned bus bars are located and held in position by insertion into parallel retainer slots located on the internal surface of one of the case halves that mutually clamp the bus bars in position. Because orifices are provided in the case in the form of the terminal housing and connector receptacle, the non-orifice parts of the case are able to support the vertical bus bars in the above slots, thus forming a structure that allows the wire terminals to connect to the parts of the bus bars exposed through the orifices. Furthermore, a structure may be utilized in which the retainer slots are provided on the internal surfaces of both cases to support both edges of the vertical bus bars.

The vertical bus bars may be formed as one continuous bus bar if they are aligned on the same plane. When a non-continuous circuit is needed, the bus bar is split into multiple bus bars. Therefore, the rectangular vertical bus bars sometimes have different lengths and are aligned in series with spaces therebetween.

One or both of the longitudinal edges of the vertical bus bars that are gripped by the wire terminals may be tapered. This tapered edge makes it easy to insert the vertical bus bar into a slot on an inner surface of the case, and to insert the wire terminal onto the vertical bus bar.

At one part of the base module case, a fuse module is installed to which a fuse attachment part is provided for attaching the fuse. The fuse module also incorporates a fuse bus bar, connecting to a fuse terminal at one end and directly connecting to the vertical bus bar through an aperture in the base module case at the other end.

At one part of the base module case, a relay module is installed, to which a relay attachment for attaching relay, and a relay bus bar, connecting to a relay terminal at one end and directly connecting to the vertical bus bar through an aperture in the base module case at the other end, are provided.

The fuse attachment part of the fuse module and relay attachment part of the relay module join the baseboard of the fuse and relay modules by having case parts that cover the baseboard and form the fuse and relay attachment parts, or by having case parts that form the baseboard molded with the fixed bus bar, having the built-in fuse and relay attachment parts.

The above fuse and relay bus bars are provided with a tab with a grip slot that bends from the fixed part at the baseboard, wherein one side of the tab is formed to grip fuse and relay terminals, and the other side of the tab is formed to grip the edge of the vertical bus bar as described above.

The above fuse module incorporates an insertion part at the terminal of a load side wire that connects to the load side fuse terminal attached to the fuse attachment part, and an input terminal of the fuse connects to the vertical bus bar of the above base module via the fuse bus bar.

Fuse and relay modules can be provided separately as described above, however, they can be combined as a combined fuse/relay module that incorporates fuse and relay attachment parts, and possibly fuse and relay bus bars on a common baseboard. In this case, if there is a need to connect certain fuse and relay bus bar circuits, the bus bars for those circuits are weld connected.

When separately forming fuse and relay modules, one part of the fuse bus bar that is connected to the fuse terminal of the fuse module is extended toward the relay module side, to be connected to the tip of the relay bus bar to which one end of the relay terminal of the relay module is connected.

Furthermore, an electronic control unit can be housed inside the above case, where one end of a relay terminal is connected to a conductor of the electronic control unit, and the other end grips an edge of the vertical bus bar.

In another aspect of the present invention, a junction box is provided that includes an upper case, a lower case, and a plurality of generally rectangular plate-shaped bus bars positioned between the upper case and the lower case, wherein the bus bars are spaced apart and vertically aligned such that upper and lower longitudinal edges of each the bus bar are positioned adjacent a respective one of the upper case and the lower case, and wherein at least one of the upper case and the lower case of the junction box may include multiple terminal housing compartments into which terminals connectable to external wire terminals are insertable, the terminal housing compartments being positioned adjacent selected ones of the bus bars so that terminal grip ends of inserted external wire terminals can grip and connect to the vertical bus bars.

Additionally, the junction box according to the present invention may further include at least one of a fuse module including a fuse connection circuit part and a relay module including a relay connection circuit part, and wherein the fuse connection circuit part and the relay connection circuit part are mountable on one of the upper case and the lower case and are configured to electrically connect to selected ones of the bus bars.

In another aspect of the present invention, the junction box may further include a terminal stopper provided in an inner surface of each terminal housing to lock a terminal connected to the external wire end, upon insertion of the terminal into the terminal housing. Furthermore, the junction box may also include at least one slot provided in one of the upper case and the lower case into which the vertical bus bars are inserted, and may further include a connector receptacle that houses a terminal connected to the external wire terminal, wherein the connector is fitted into a connector receptacle provided in one of the upper case and the lower case, and one of the vertical bus bars is gripped by a pair of grip ends of the terminal inside the connector.

In other aspects of the present invention, the junction box may include a plurality of terminal housings on both the upper case and the lower case, and wherein wire terminals grip both longitudinal sides of the bus bars. Moreover, each bus bar may be configured as at least one of single continuous bus bars and multiple bus bars aligned in series, and at least one longitudinal edge of each the bus bars may be tapered, or both longitudinal edges of the vertical bus bars may be tapered.

Additionally, in another aspect of the present invention, when the terminal housings of the junction box are aligned, one of the upper case and the lower case may include a retainer configured to provide a double stopper for a terminal inserted into the terminal housings.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 5(A) is an exploded perspective view of the fuse module;

FIG. 5(B) is a side view;

FIG. 5(C) is a cross-sectional view of the fuse module of FIG. 5(B) taken along the line I—I of FIG. 5(B);

FIG. 5(D) is a cross-sectional view of the fuse module of FIG. 5(B) taken along the line II—II of FIG. 5(B);

FIG. 10(A) is an exploded perspective view illustrating a connection between the fuse module and relay module and FIG. 10(B) is a detail view of a portion of the same;

FIG. 16(A) is a top view of a portion thereof and FIG. 16(B) is a perspective view of a vertical bus bar that is housed inside the junction box.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
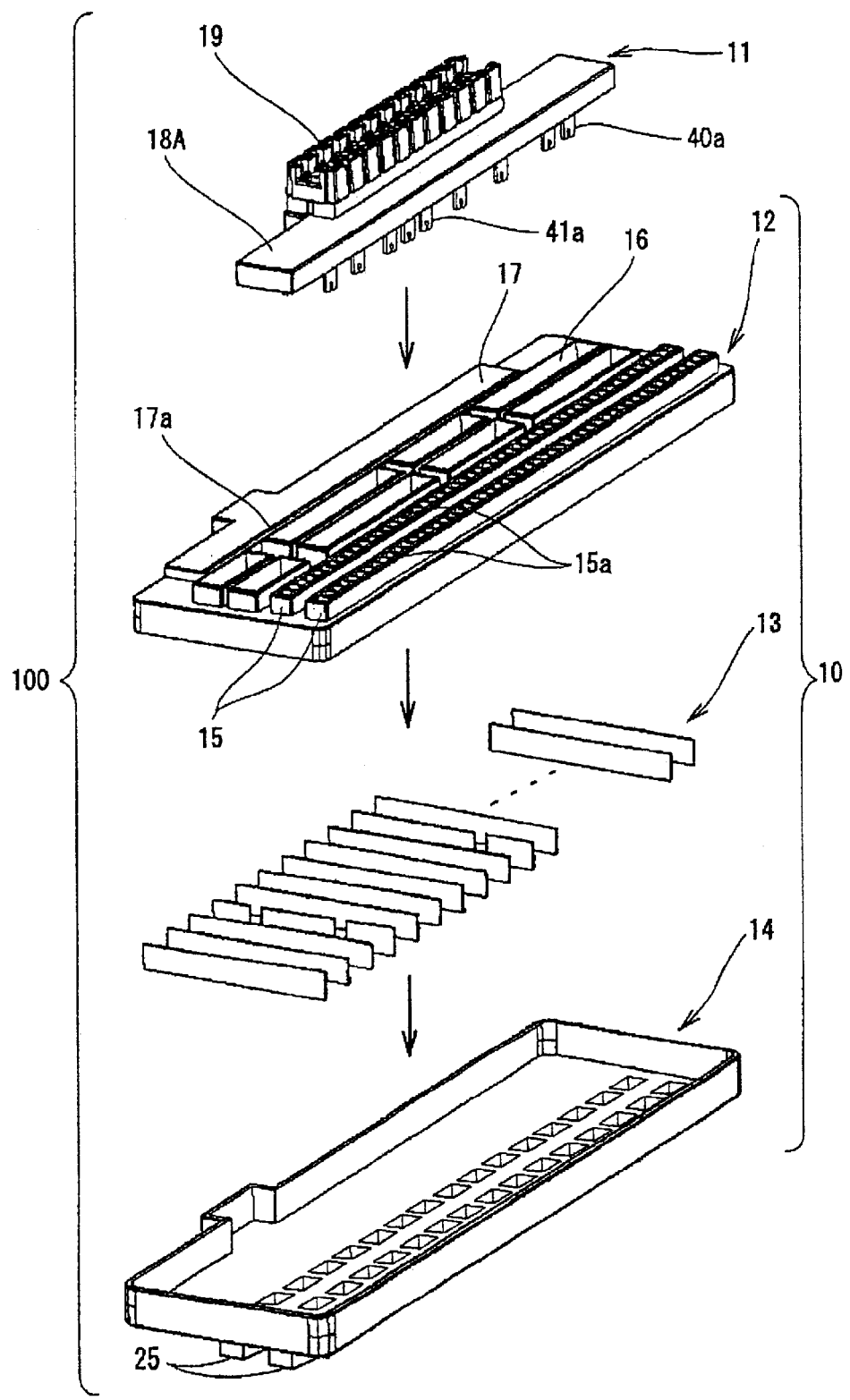
FIG. 1 is an exploded perspective view of the junction box according to a first embodiment of the present invention.

The first embodiment of the present invention is described below with reference to the drawings. FIG. 1 is an exploded perspective view of parts that form junction box 100 for connection to an automotive wire harness. Element 10 is a base module, and element 11 is a fuse module. Base module 10 houses rectangular vertical bus bars 13 in multiple parallel alignments inside a case made from upper case 12 and lower case 14. The vertical bus bars 13 form a base circuit, and wires W (FIG. 3(A)) from an external circuit are connected to vertical bus bars 13. The fuse module 11 is installed at one side of an upper surface of upper case of base module 10.

As shown in FIG. 1, upper case 12 of base module 10 provides an outer (top) surface shown in FIG. 1, and an inner (bottom) surface shown in FIG. 2. Terminal insertion parts 15 extend across most of the length of one side of the outer surface of upper case 12 in the form of two separate aligned protruding structures. Each terminal insertion part 15 contains multiple aligned terminal housings 15a. A fuse module installation part 17 is provided at the other side of the outer surface of upper case 12, and a lock unit (not shown) is provided between upper case 12 and the fuse module installation part 17. The fuse module installation part 17 incorporates multiple aligned terminal insertion orifices 17a. Eight protruding connector receptacles 16 are located between the fuse module installation part 17 and the terminal insertion parts 15.

Figure 2A:
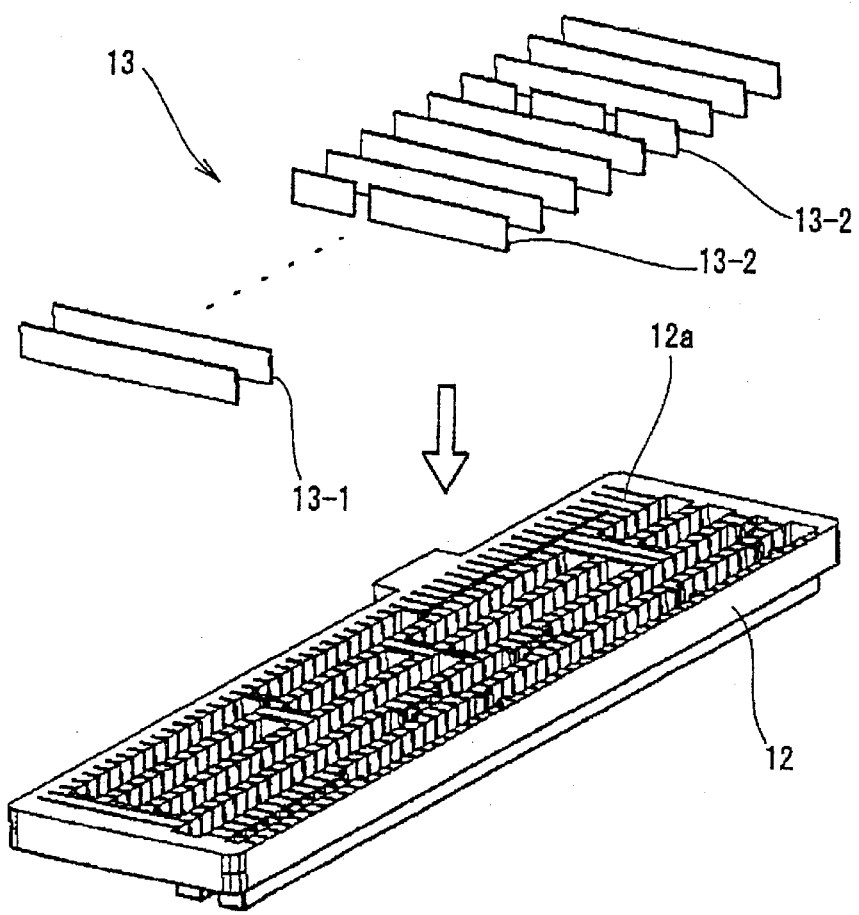
FIG. 2(A) is an exploded perspective view illustrating the installation of the vertical bus bars to the under side of upper case, according to the first embodiment.

As shown in FIG. 2(A), the inner surface (bottom surface) of upper case 12 incorporates multiple narrow slots 12a to attach multiple aligned vertical bus bars 13. Slots 12a, located along the narrow width direction of the upper case, bridge the bottom surface voids of the terminal insertion parts 15 and the connector receptacles 16, with vertical bus bars 13 being positioned by insertion into the slots 12a. Lower case 14 also includes terminal insertion parts 25 that align terminal housings 25a in two protruding rows.

Figure 2B:
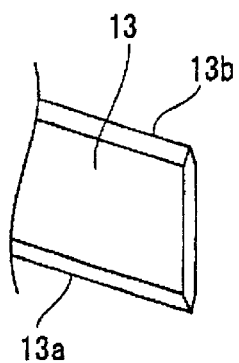
FIGS. 2(B) and 2(C) are detailed views of portions of the vertical bus bars.
Figure 2C:
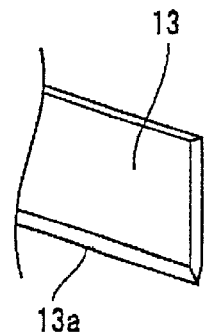

The vertical bus bars 13 are gripped and positioned by insertion into the slots 12a of the above upper case. One longitudinal edge 13a is exposed to the bottom openings of the terminal insertion parts 15 and the connector receptacles 16 in upper case 12. The opposite longitudinal edge 13b of vertical bus bar 13 is exposed to the bottom openings of the terminal insertion parts 25 of lower case 14. Both longitudinal edges 13a and 13b of vertical bus bar 13 taper off at their ends, as shown in FIG. 2(B), so that they are easily and fixedly inserted into slot 12a and easily join with wire terminal 23, which insert into terminal housings 15a and 25a as shown in FIG. 3(B). Additionally, in cases where only a terminal insertion part 15 is installed at the upper case 12 side, only one edge 13a may be tapered as shown in FIG. 2(C), for connection to wire terminals 23, which are inserted into terminal insertion parts 15.

Vertical bus bars 13 that are inserted and fixed into slots 12a are configured in two ways. As shown in FIG. 2(A), bus bars 13-1 are long continuous rectangular bus bars, and bus bars 13-2 are multiple bus bars aligned in series with spaces therebetween.

Figure 3A:
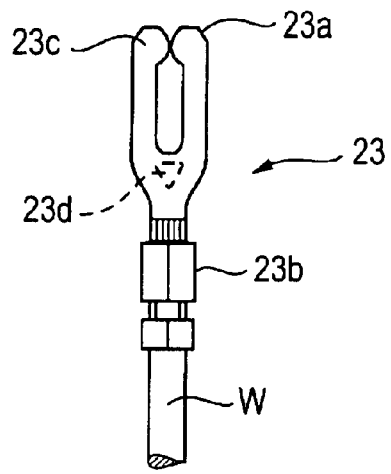
FIG. 3(A) is a front view of a terminal installed to the wire terminal of the first embodiment.
Figure 3B:
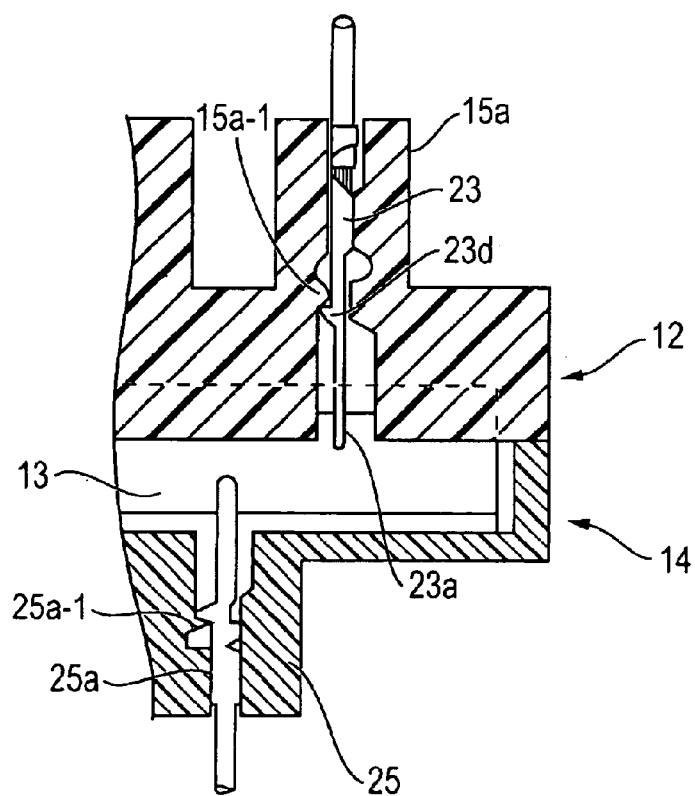
FIG. 3(B) is a cross-sectional view of the relevant portion of the junction box.

As shown in FIG. 3(A), tuning-fork-shaped terminals 23 are crimped to ends of external circuit wires W, and are directly inserted into terminal housings 15a and 25a. As shown in FIG. 3(B), the connection is made by the pair of grip ends 23a of terminal 23 gripping vertical bus bar 13.

In order to fit over the edge, grip, and connect to the vertical bus bar 13, terminal 23 includes a symmetrical pair of ends 23a that branch into a tuning fork shape outward from the end of electrical contact wire crimp part 23b. Stopper lips 23d are formed at the internal extremities of grip ends 23a as mutually facing protrusions in close proximity. The structure of terminal 23 is not limited to the tuning fork shape described above, and as such may be provided as any appropriately structured grip terminal.

Terminal stoppers 15a-1 and 25a-1 protrude from the inner surface of terminal housings 15a and 25a so that they lock against stopper lip 23d that protrudes from the back of terminal 23, and maintain terminal 23 is thus locked in the predetermined position within terminal housings 15a and 25a.

Figure 4A:
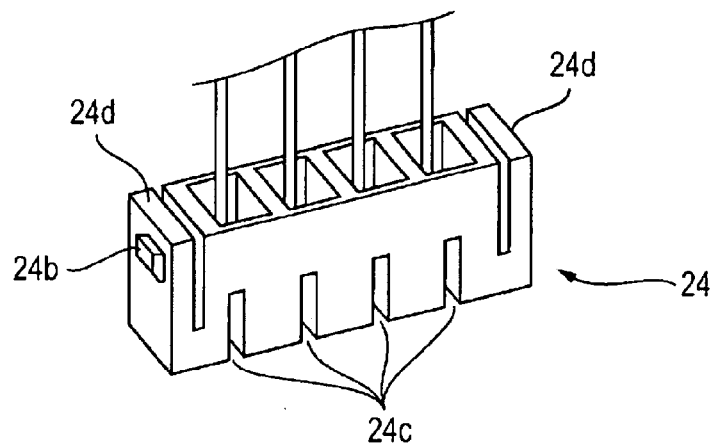
FIG. 4(A) is a perspective view of a connector according to the first embodiment.
Figure 4B:
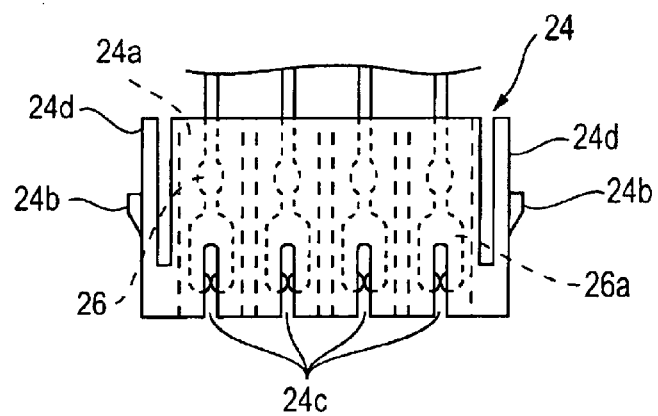
FIG. 4(B) is a front view of the connector.

Upper case 12 also includes connector receptacle 16. As shown in FIGS. 4(A) and 4(B), the terminals of wire harness W/H wires are connected to connectors 24 so that connectors 24 can be internally connected to connector receptacle 16 and also connected to vertical bus bars 13.

Inside each terminal housing 24a of connector 24, a terminal 26, which is crimped to the terminal ends of the wire harness wires, is inserted and locked. Terminal 26 has the same configuration as terminal 23. To house connector 24, slots 24c are provided at an end of connector 24 inside each terminal housing 24a to position grip end 26a of terminal 26 inside slot 24c. Protruding lock pieces 24d, on which stop hooks 24b are formed, are provided on both sides of connector 24.

Figure 4C:
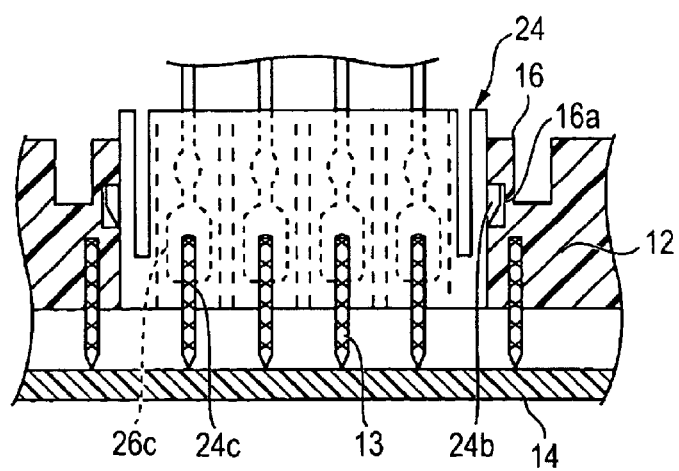
FIG. 4(C) is a cross sectional view of a portion of the junction box.

When connector 24 is inserted into connector receptacle 16, as shown in FIG. 4(C), vertical bus bars 13 enter the slots 24c of connector 24, and grip ends 26a of terminals 26 grip vertical bus bars 13 to provide electrical connection. At this time, stop hooks 24b of connector 24 are stopped and locked within stop grooves 16a located in the internal wall of the connector receptacle. Accordingly, when the connector 24 is inserted into and locked with connector receptacle 16, internal terminal 26 is connected to vertical bus bar 13.

As described above, a structure is provided in which base module 10 houses vertical bus bars 13 inside upper case 12 and lower case 14, wherein wire end terminals 23 are inserted into and locked with terminal housings 15a and 25a, and terminals 26 of connector 24 are inserted into and locked within connector receptacle 16, and thus are electrically connected through their attachment to longitudinal edges 13a and 13b of vertical bus bars 13.

As shown in FIG. 5(A), the fuse module 11 installed at the upper case 12 side of base module 10, is formed of a case part 18A, that has approximately the same shape as the contour of fuse module installation part 17 of upper case 12, and baseboard 18B that is installed inside case part 18A. Fuse attachment parts 19 protrude in parallel alignment from one side of case part 18A, and first fuse bus bars 40 and second fuse bus bars 41 are attached on the upper and lower surface of baseboard 18B. One end of first fuse bus bar 40 is attached to the upper surface of baseboard 18B and includes tab 40b that is bent upward, and the other end includes tab 40a that is bent downward. Second fuse bus bars 41 are attached to the lower surface of baseboard 18B and include a tab 41b that protrudes upward through a hole of baseboard 18B at one end, and a tab 41a that bends downward from a side edge of baseboard 18B at the other end.

All of tabs 40a, 40b, 41a, and 41b of first and second fuse bus bars 40 and 41 are shaped into terminal grips that are provided with grip slots. Tabs 40a and 41a, which protrude downward, grip and connect to edges of vertical bus bars 13 that are inserted into their grip slots through terminal insertion orifices 17a provided in upper case 12. Tabs 40b and 41b, which protrude upward, grip and connect to terminals of fuses 42.

As shown in the FIG. 5(B) embodiment, eleven fuse attachment parts 19 are aligned, and eight of which are first type fuse attachment part 19a, and three are second type fuse attachment part 19b. Of course, any number of suitable types of fuse attachment parts may be utilized.

As shown in FIG. 5(C), first type fuse attachment part 19a contains tab 40b of first fuse bus bar 40, and also includes terminal receiver 21 for electrically live wire W that protrudes downward at the external part of case 18A. Terminal receiver 21 directly receives and locks live wire terminal 22 to grip live terminal 42b of fuse 42, while input terminal 42a of fuse 42 grips tab 40b of first fuse bus bar 40.

As shown in FIG. 5(D), second type fuse attachment part 19b houses tab 40b of first fuse bus bar 40 and tab 41b of the second fuse bus bar 41 to connect input terminal 42a of fuse 42 and live terminal 42b to tab 40b and tab 41b, respectively. Accordingly, in fuse module 11, fuses 42 are connected to vertical bus bars 13 of base module 10 via fuse bus bars 40 and 41, whereas some of the fuses 42 connect to the live terminal of the live wire W.

With junction box 10 configured as described above, base module 10 is assembled by installing vertical bus bars 13 in parallel alignment between upper case 12 and lower case 14. This type of base module 10 configuration makes it possible to connect electrical wires W, in an aligned condition, to longitudinal edges 13a and 13b of vertical bus bars 13 in a single operation in which wires W are inserted into mutually aligned terminal housings 15a and 25a located in upper case 12 and lower case 14. Also, simply by fitting connector 24 of the wire harness terminal into connector receptacle 16, terminals 26 inside connector 24 are connected to vertical bus bars 13. Accordingly, a circuit modification is executed simply by changing the connection positions of wire W and vertical bus bars 13. Because base module 10 and fuse module 11 are separated, and fuse bus bars 40 and 41 of fuse module 11 are connected to vertical bus bars 13 of base module 10, fuse module 11 is not affected if the circuit modifications are only in the form of the connections of the base circuit and external wires. Similarly, base module 10 is not affected if the changes are made only in the fuse connection circuit of fuse module 11.

The base circuit of base module 10 is formed with rectangular vertical bus bars 13 that are inserted and fixed in the aligned slots of upper case 12. Therefore, it is possible to assemble vertical bus bars 13 in upper case 12 by a single automatic operation. Accordingly, the assembly efficiency of base module 10 is improved.

Figure 6:
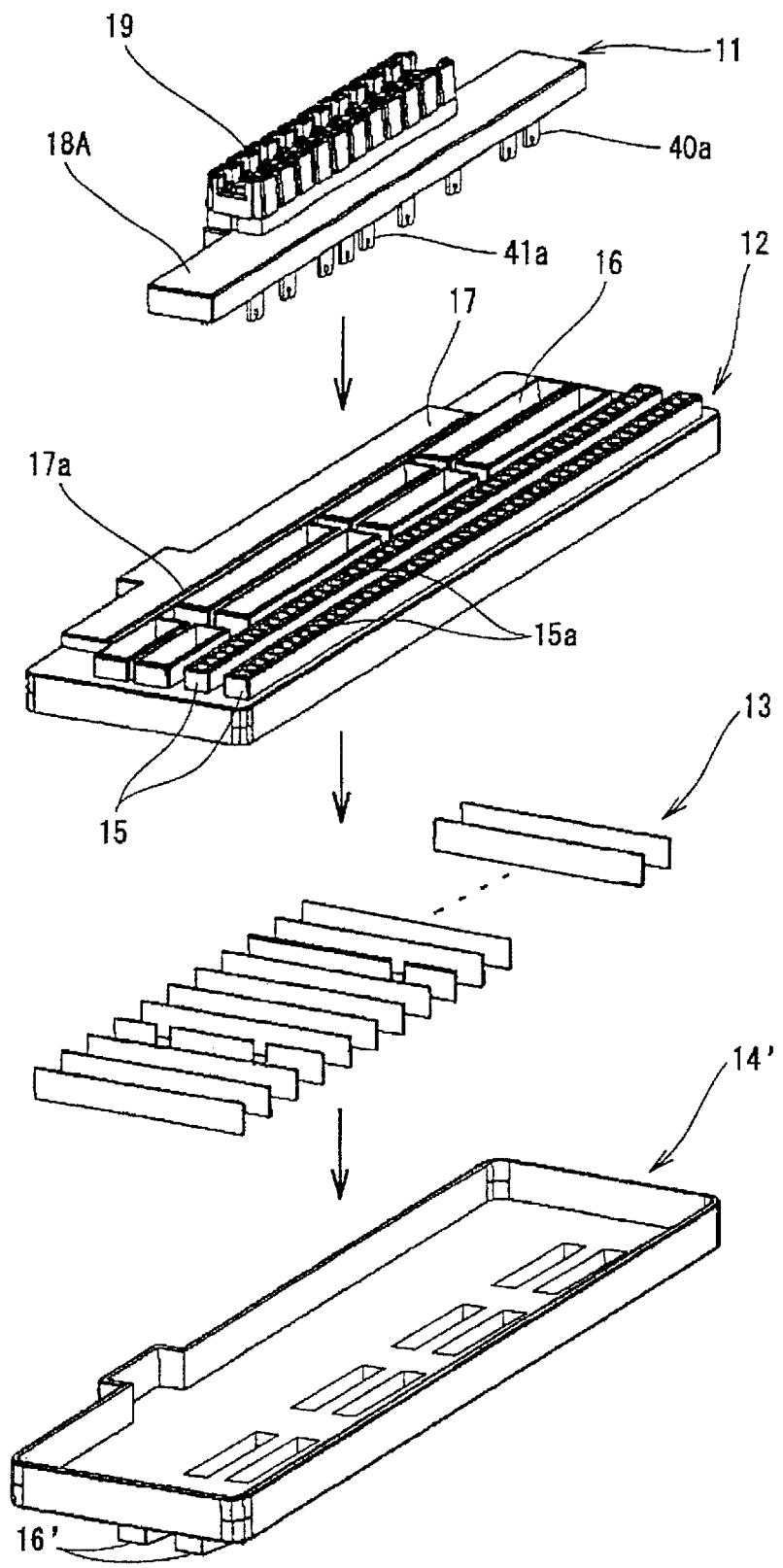
FIG. 6 is an exploded perspective view of the junction box according to a second embodiment.

FIG. 6 illustrates a second embodiment of the present invention. The differences between the first and second embodiments are that lower case 14' has multiple connector receptacles 16' but no terminal housings. This configuration is suitable for when the lower case is frequently connected to multiple wire terminal connectors on the wiring harness. Because the configuration and components of this embodiment that are identical to those of the first embodiment and retain the same identification numbers, their explanations have been omitted.

Figure 7:
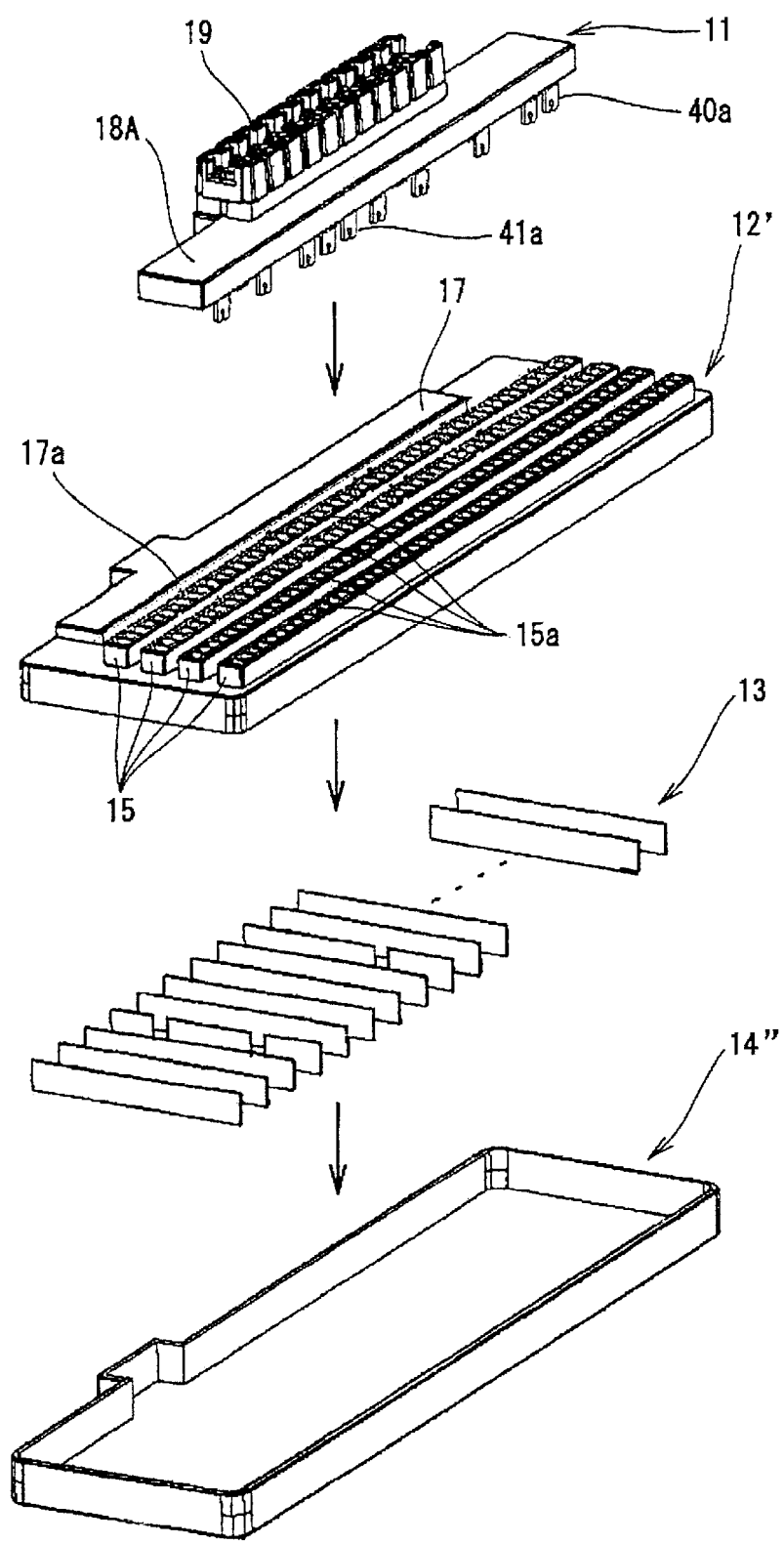
FIG. 7 is an exploded perspective view of the junction box according to a third embodiment.

FIG. 7 illustrates a third embodiment of the present invention. The differences between the first and third embodiments are that, in the third embodiment, upper case 12' is provided with 4 rows of terminal insertion parts 15 in which terminal housings 15a are aligned. Connector receptacles, however, are not provided. Also, lower case 14" is not provided with terminal insertion parts or connector receptacles. Accordingly, in the third embodiment, there is no provision for the attachment of wire connectors. The connection of the internal and external circuits of the junction box is completed by inserting the wire W terminals into the terminal housings 15a and connecting the same with vertical bus bars 13, thus the internal circuit is connected to the external circuit without connectors.

Figure 8:
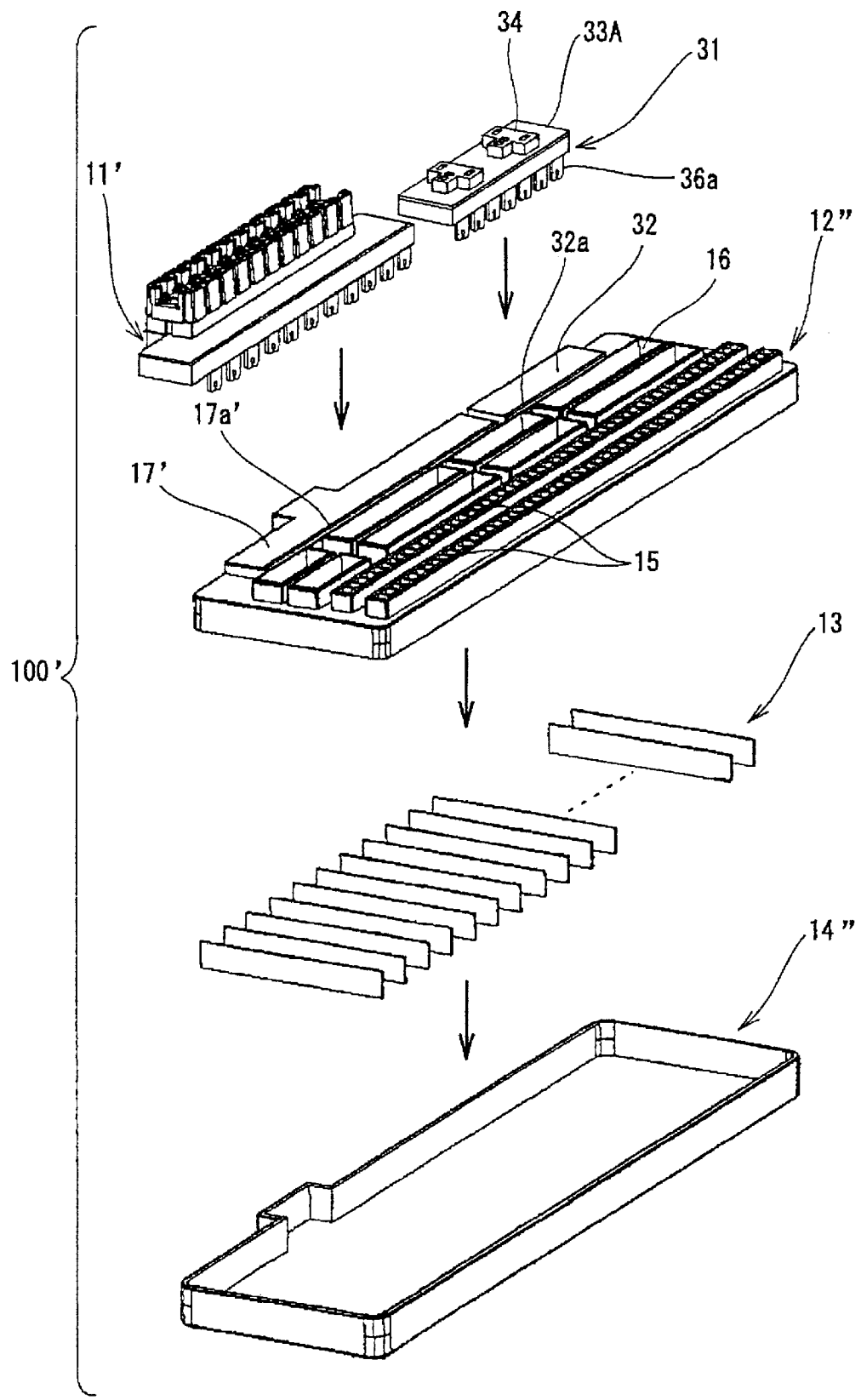
FIG. 8 is an exploded perspective view of the junction box according to a fourth embodiment.
Figure 9:
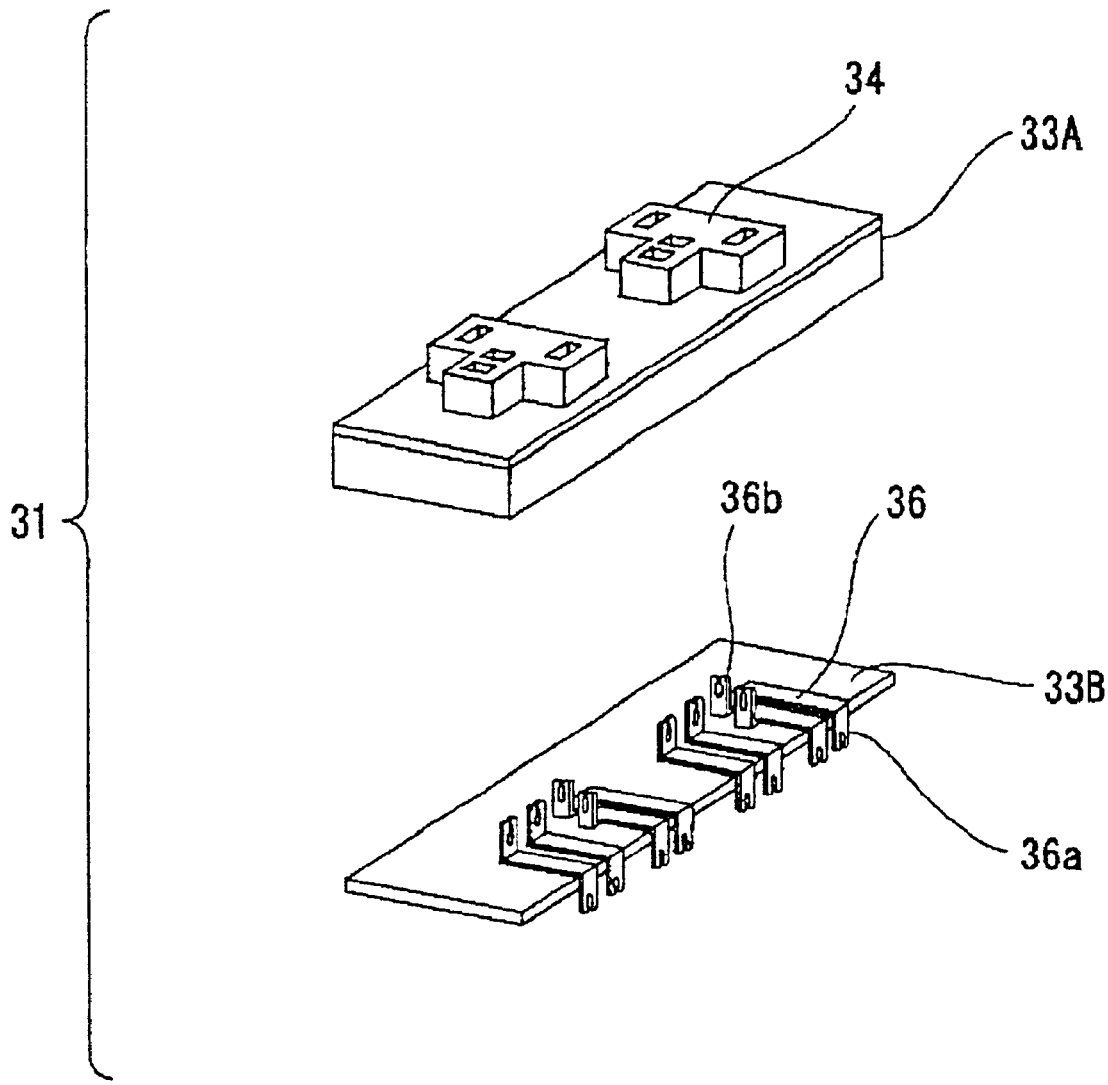
FIG. 9 is an exploded perspective view of the relay module according to the fourth embodiment.

FIGS. 8 and 9 illustrate a fourth embodiment of the present invention. In the fourth embodiment a relay module 31 and a fuse module 11' are attached to one side of upper surface of upper case 12" of base module 10.

Fuse module installation part 17' and relay module installation part 32 are aligned on one side of upper case 12", and terminal insertion orifices 17a' and 32a are provided at the side of these installation parts. Fuse module 11' has been configured as a shortened version of fuse module 11 of the first embodiment in order to match the size of fuse module installation part 17', but the basic structure of fuse module 11' is the same as that of the first embodiment.

Relay module 31 has approximately the same shape as relay module installation part 32, and has a configuration similar to fuse module 11'. In other words, relay module 31 is formed of a case part 33A and a baseboard 33B, relay attachment parts 34 protruding from case part 33A, and relay bus bars 36 attached to the upper surface of baseboard 33B. As shown in FIG. 9, relay bus bars 36 are attached to the upper surface of baseboard 33B and are bent upward at one end to form tabs 36b with a grip slot, and are bent downward at the other end to form tabs 36a with a grip slot. Tabs 36a are connected to vertical bus bars 13 through terminal insertion hole 32a of upper case 12".

Accordingly, with junction box 100' in which fuse module 11' and relay module 31 are assembled on base module 10, it is possible to use fuse and relay connection circuits for various application, if there are no changes in the circuits.

Also, junction box circuit connections are easily performed since the circuits of fuse module 11' and relay module 31 simply grip vertical bus bars 13 of the circuits of base module 10.

Figure 10A:
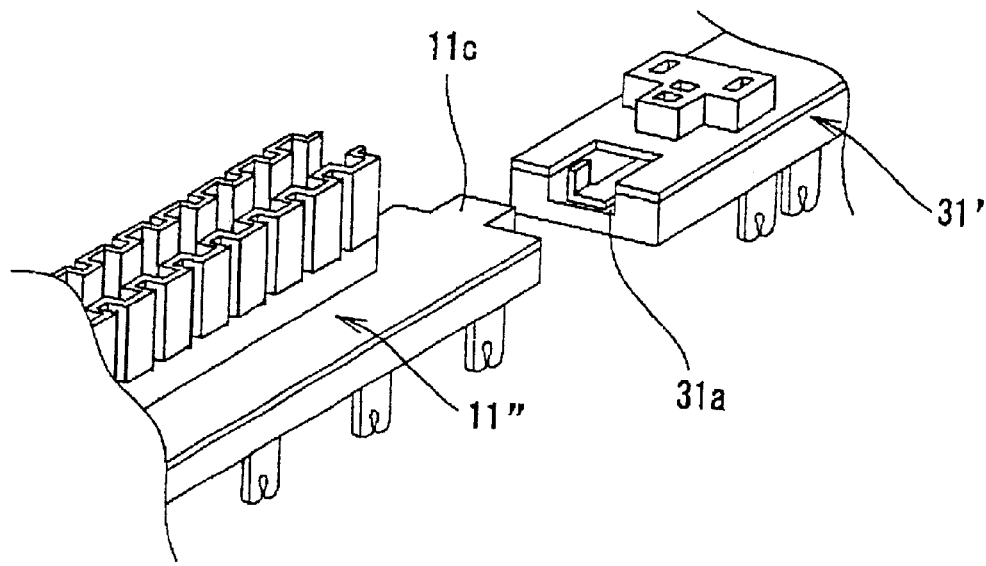
FIGS. 10(A) and 10(B) depict a variation of the fourth embodiment, where
Figure 10B:
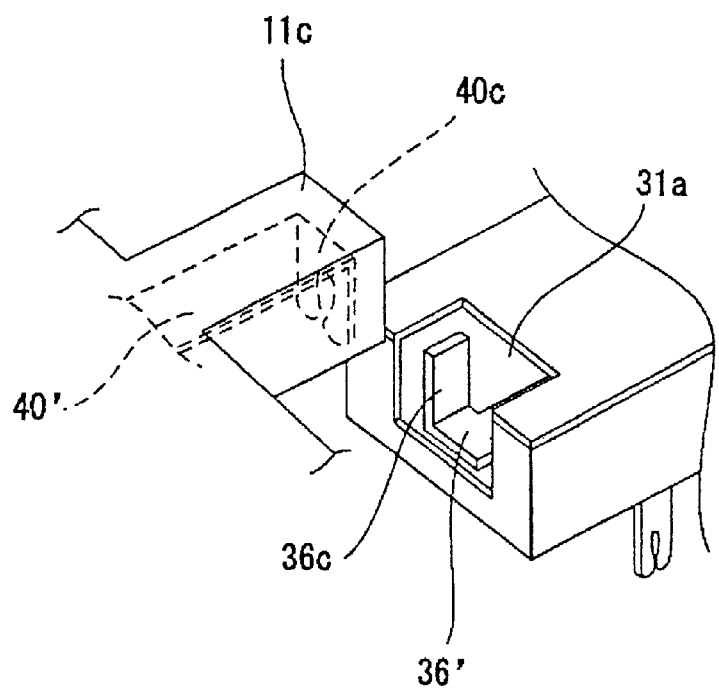

FIG. 10 illustrates a variation of a fourth embodiment of the present invention. This variation connects fuse bus bar 40' of fuse module 11' and relay bus bar 36' of relay module 31'.

Protruding part 11c is provided at the end of fuse module 11" opposite to relay module 31'. Terminal grip 40c, bent downward as an extension of fuse bus bar 40', is exposed at the lower surface of protruding part 11c. Void 31a is provided at the end of relay module 31' opposite to fuse module 11". Tab 36c bends upward as an exposed extension of relay bus bar 36'. Inserting protruding part 11c into void 31 forms a frictionally maintained connection between terminal grip 40c and tab 36c.

Figure 11A:
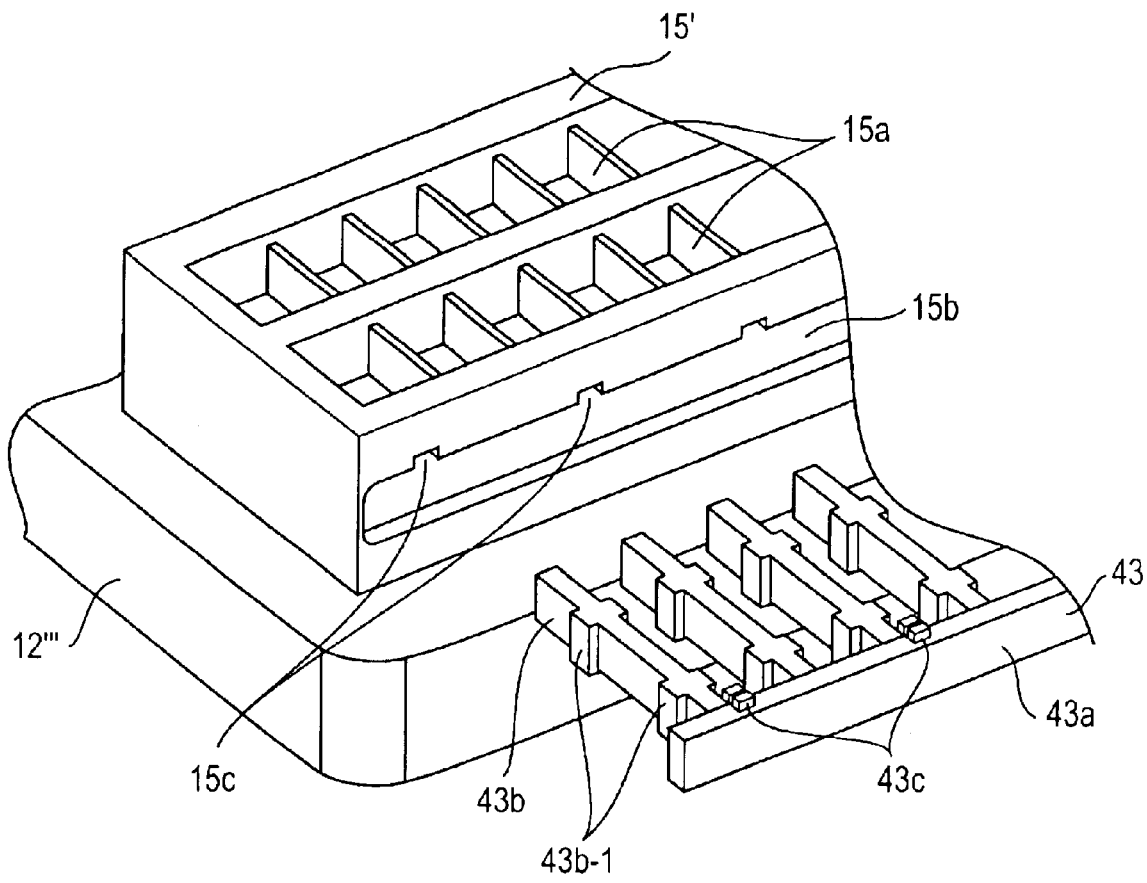
FIG. 11(A) is a perspective view illustrating the configuration of a retainer according to a fifth embodiment.
Figure 11B:
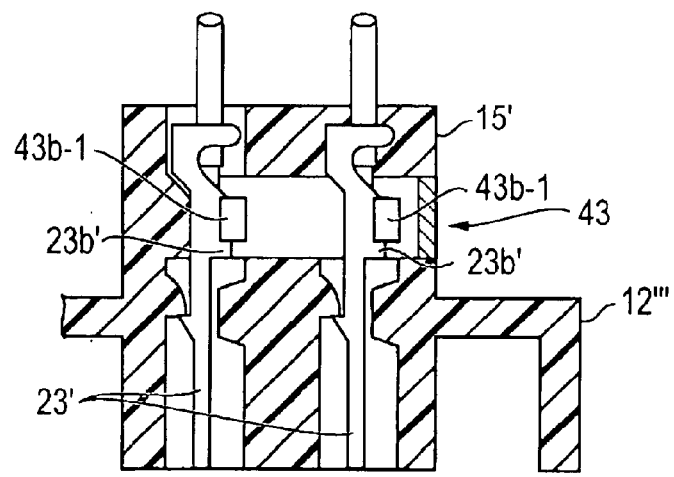
FIG. 11(B) is an enlarged cross-sectional view of a portion of the retainer configuration.

FIG. 11 is a fifth embodiment of the present invention. The differences between the fifth and first embodiments are that the terminal insertion parts 15' are incorporated continuously, within a single two-row structure on upper case 12''', and that a retainer 43, in order to provide a double stopper structure, is inserted across the two rows of terminal insertion part 15' that contains multiple terminal housings 15a' in each row.

Retainer insertion orifice 15b is provided on the exterior side of two-rank terminal insertion part 15', in order to insert comb shaped retainer 43. Retainer 43 incorporates insertion board 43b that extends from retainer board 43a in the direction of terminal housings 15a'. Insertion board 43b is provided with two stop tabs 43b-1 that lock against crimp flange 23b' of terminal 23' that is inserted into terminal housing 15a'. Retainer board 43a of retainer 43 is provided with lock hooks 43c that connect and lock with lock hole 15c formed at retainer insertion orifice 15b.

As described above, by employing retainer 43 as a double locking mechanism, it is possible to detect an incomplete insertion of terminals 23' into terminal housing 15a'. This configuration makes it possible to increase the reliability of the electrical connection between the external wires and vertical bus bars of the base module.

Figure 12:
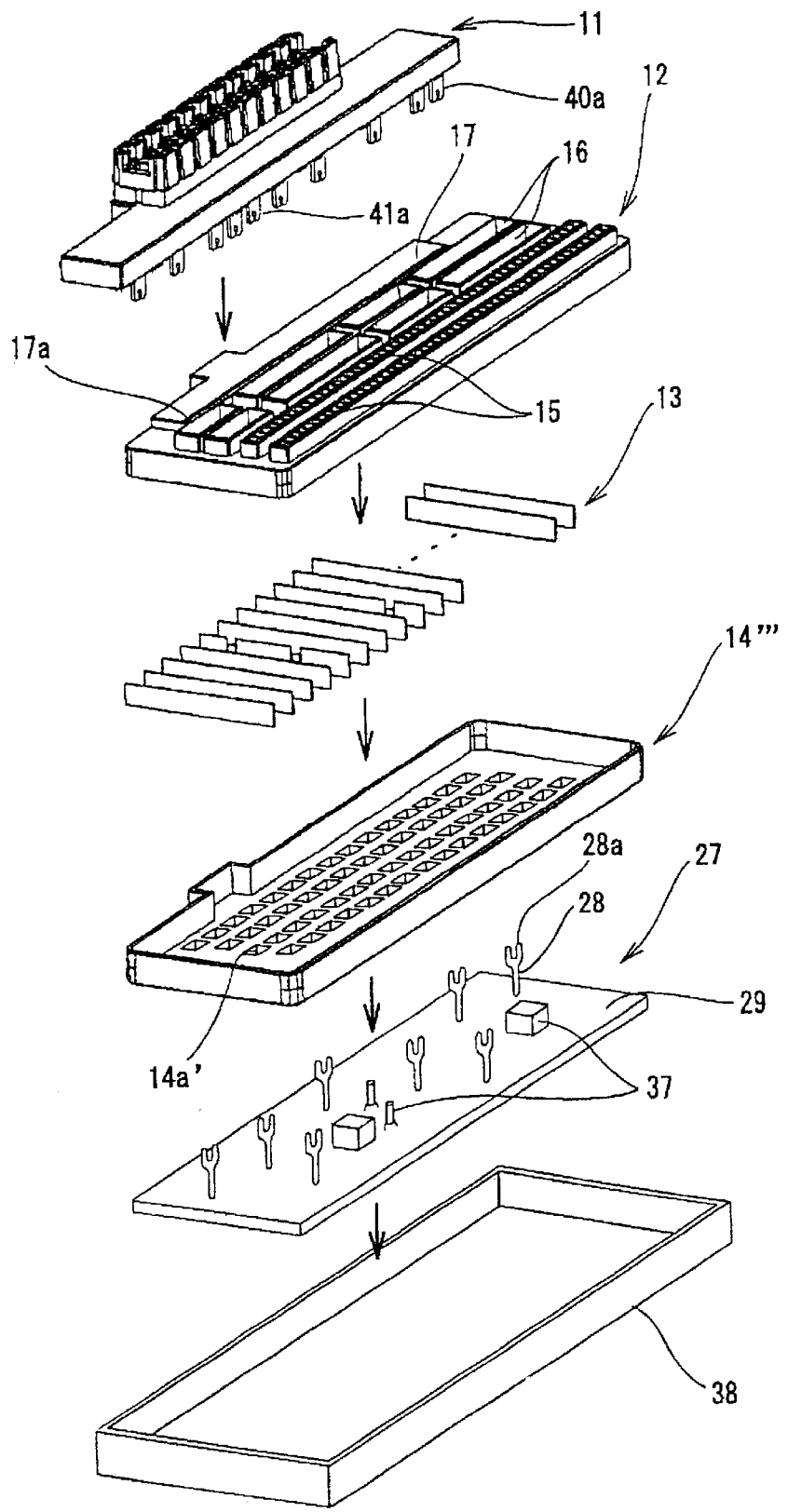
FIG. 12 is an exploded perspective view of the junction box according to a sixth embodiment.
Figure 13:
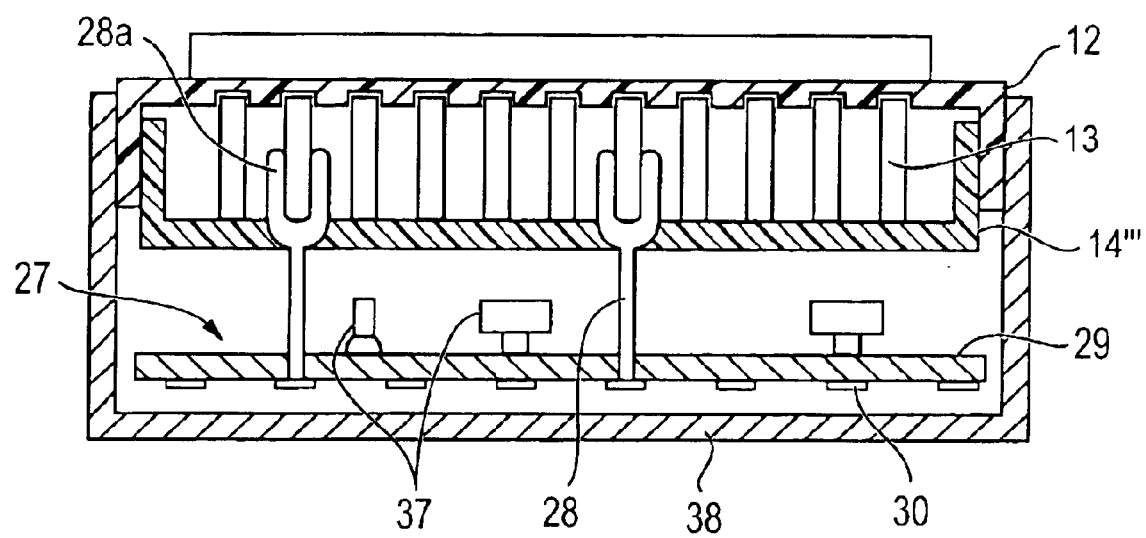
FIG. 13 is a schematic cross sectional view of the junction box according to the sixth embodiment.

FIGS. 12 and 13 illustrate a sixth embodiment of the present invention. In this embodiment, an electronic control unit 27 is assembled beneath lower case 14''', and a lower cover 38 is provided to cover electronic control unit 27.

Electronic control unit 27 incorporates thin layer conductors 30 printed on the lower surface of baseboard 29 and protruding relay terminals 28, one end of which is soldered to a conductor 30 through a void in baseboard 29 at one end of upper surface of baseboard 29. Grip slot 28a is provided at the upper part of relay terminal 28. Also, electronic devices 37 or the like are installed on the upper surface of baseboard 29. Grip slots 28a grip the lower edge of vertical bus bars 13 through void 14a' in lower case 14''', in order to connect conductors 30 of electronic control unit 27 and vertical bus bar 13. Lower cover 38 covers the bottom of control electronic control unit 27. Because the configuration and components of this embodiment that are identical to those of the first embodiment and retain the same identification numbers, their explanations have been omitted.

Figure 14:
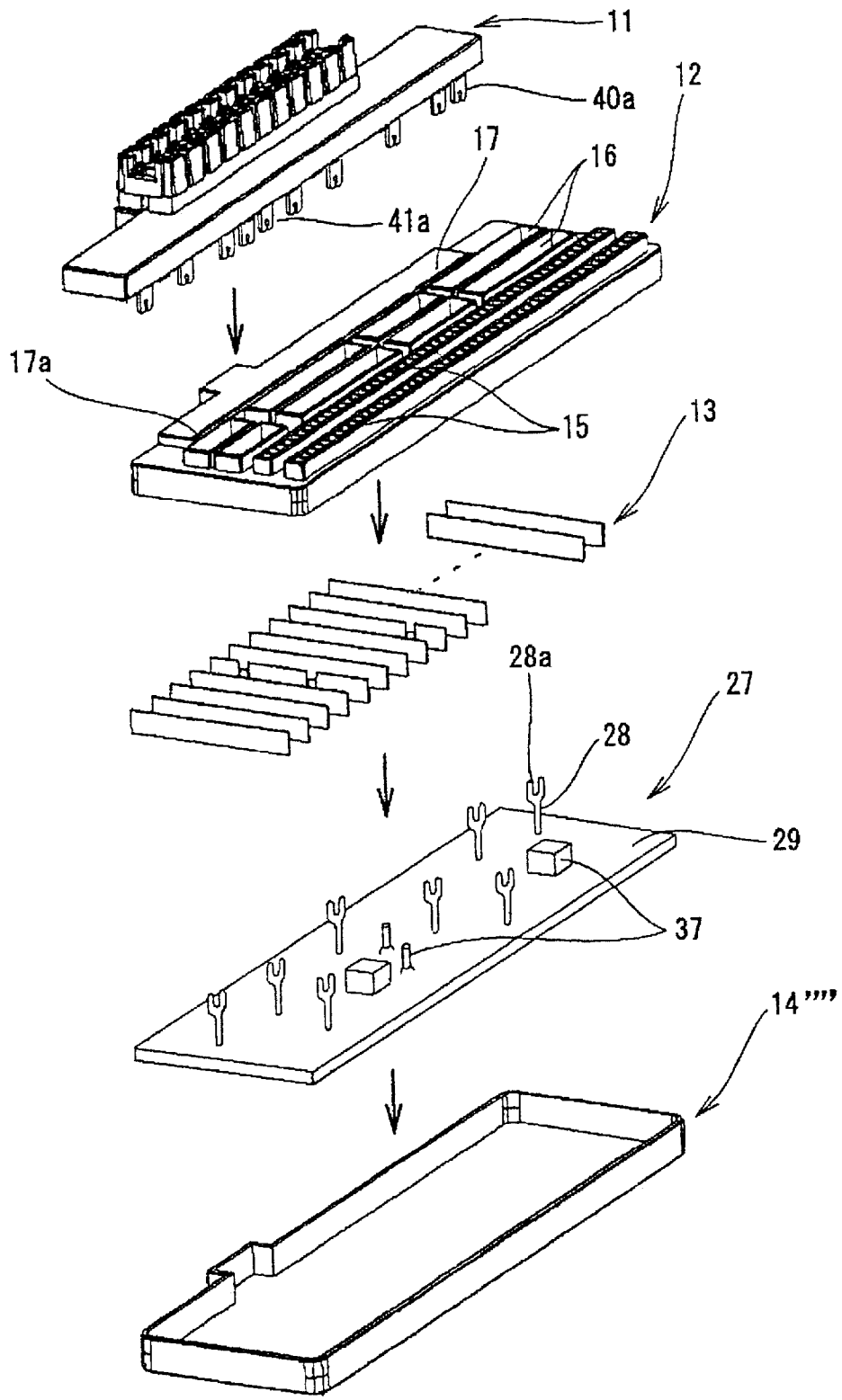
FIG. 14 is an exploded perspective view depicting a variation of the junction box according to the sixth embodiment.
Figure 15:
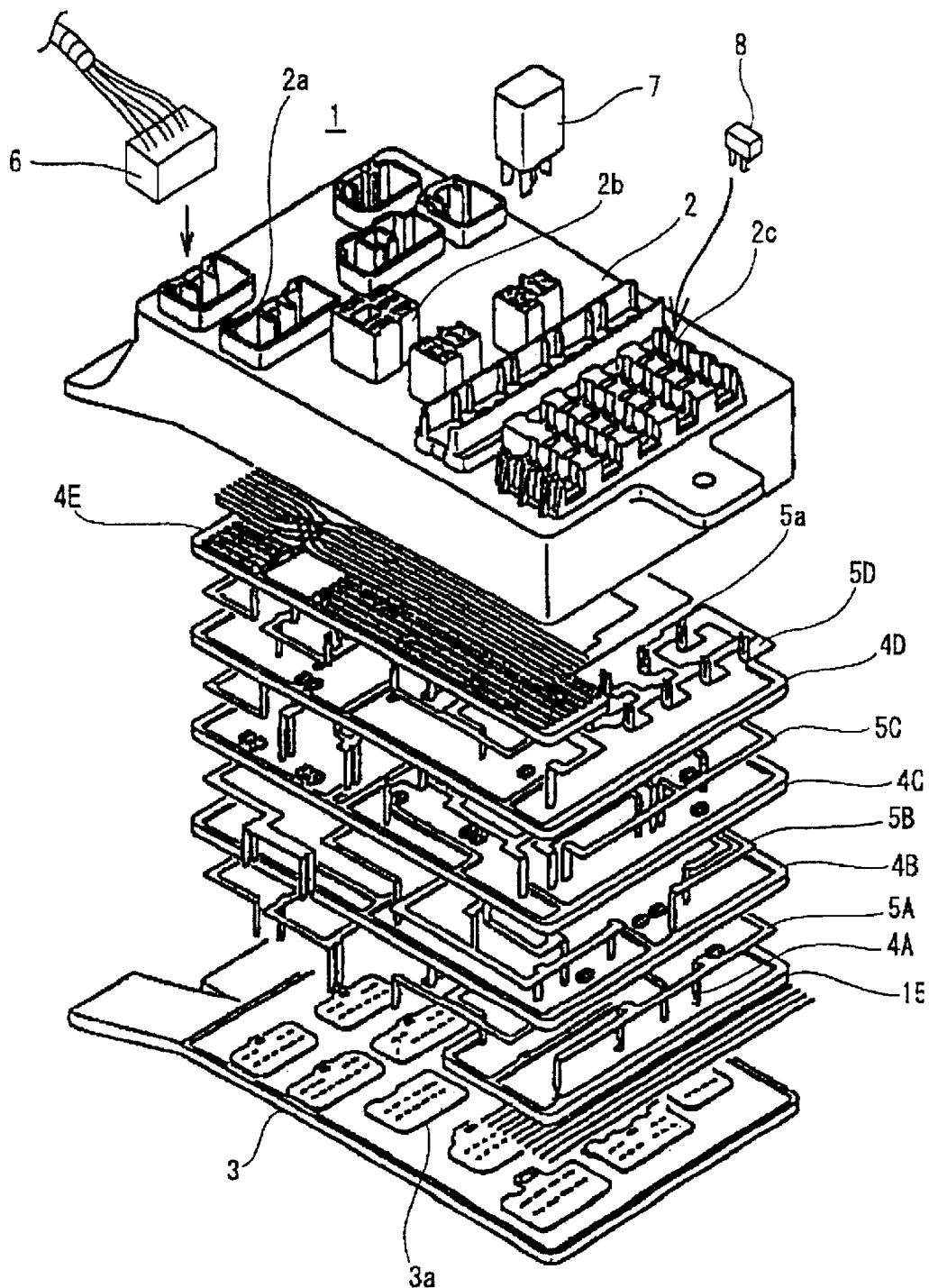
FIG. 15 is an exploded perspective view of a conventional junction box.
Figure 16A:
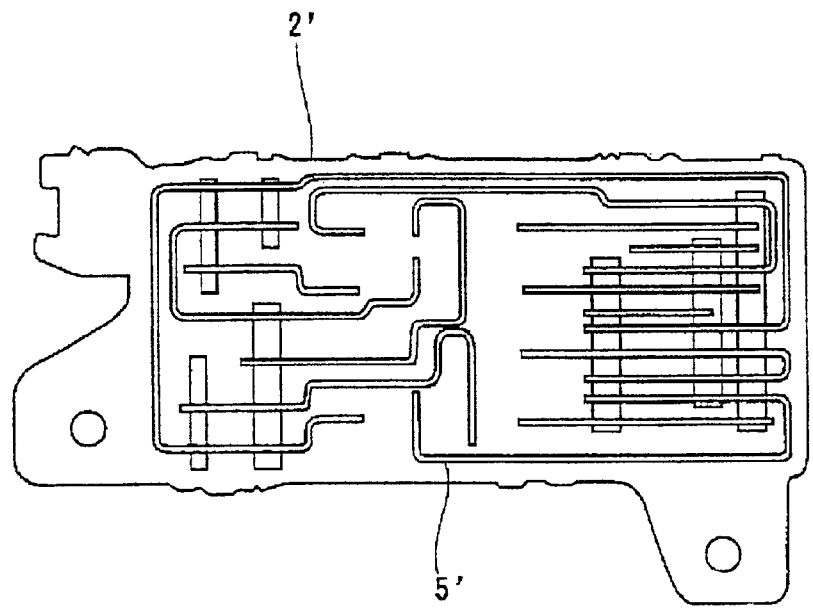
FIGS. 16(A) and 16(B) depict another conventional junction box, where
Figure 16B:
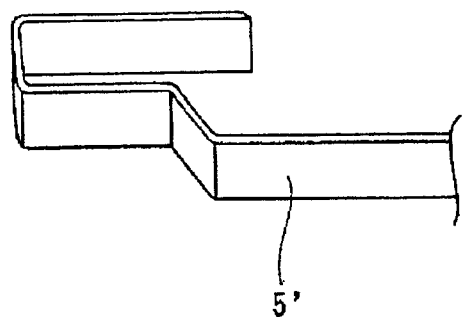

FIG. 14 is a variation of the sixth embodiment of the present invention. The differences between this variation and the first version of the sixth embodiment are that lower case 14"" does not include terminal housings, and electronic control unit 27 is incorporated in a dead space between vertical bus bar 13 installed at upper case 12 and lower case 14'''. Similar to the connection method of the sixth embodiment, electronic control unit 27 and vertical bus bar 13 are frictionally connected by grip slot 28a of relay terminal 28 joining to the lower edge of vertical bus bar 13.

It is also possible to house the electronic control unit in a base module case and a separate unit case, and to install the protruding part from the unit case on the upper surface of the upper base module case, and to locate the base module case and unit case in a parallel alignment. In this case, the grip terminal, which is connected to the conductor of the baseboard inside the unit case installed on the upper surface of the upper case, grips the vertical bus bar inside the base module through holes of the unit case and upper case. Or, the lower base module case and the lower case of the electronic control unit can be aligned, the electronic control unit installed to the lower case of the electronic control unit, and an upper cover placed over the base module and the lower case of the electronic control unit.

As apparent from the above explanation, the junction box configured according to the present invention incorporates a base module that includes a base circuit part connected to an external circuit through external wires, and a rectangular vertical bus bar is used as a circuit body of the base module. Since the vertical bus bars are used as a main internal circuit in the form of rectangular plates aligned inside a case, a configuration is provided that does not require a conventional bend forming process and can obtain a 100% yield from a conductive metal plate, which omits the bend forming process, and which enables automatic assembly of the inside of the case in a single operation.

Furthermore, the junction box is assembled by dividing the internal circuits of the junction box into a base circuit part that is connected to an external circuit, and fuse and/or relay connection circuit parts, having a base module that incorporates the base circuit part and a fuse module that incorporates the fuse connection circuit part and/or relay module that incorporates the relay connection circuit part. Therefore, if there are any specification changes in the fuse and/or relay connection circuit parts, it is only necessary to change the corresponding fuse and/or relay modules, a structure that simplifies the process for specification changes. Conversely, when the external wire connection circuit is modified, it is only necessary to change the connected positions of the wires that are connected to the vertical bus bars of the base module, thus simplifying the process of circuit changes in this case as well.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A junction box that is divided into a base circuit part connectable to an external circuit, and at least one of a fuse connection circuit part and a relay connection circuit part, said junction box comprising:

a base module including a base circuit, said base module including an upper case and a lower case;

at least one of a fuse module including a case and the fuse connection circuit part having bus bars and a relay module including a case and the relay connection circuit having bus bars said at least one of the fuse module and the relay module being connectable to said base module;

wherein the base circuit part of said base module is configured with rectangular-shaped vertical bus bars that are aligned in parallel in an internal part formed from said upper case and said lower case; and wherein an outer surface of one of said upper case and said lower case includes multiple terminal housings into which terminals connectable to external wire ends are insertable, and each terminal includes a pair of terminal grip ends that grip and connect to the vertical bus bars.

2. The junction box according to claim 1, further comprising:

at least one slot provided in a housing of a connector into which said vertical bus bars are inserted; and the housing of the connector that houses said terminal connected to the external wire end, wherein said connector is fitted into a connector receptacle provided in said case, and one of said vertical bus bars is gripped by said pair of grip ends of the terminal inside the connector.

3. The junction box according to claim 2, further comprising:

said terminal housing and/or said connector receptacle on both surfaces of a base module case, wherein said terminals grip both longitudinal sides of the parallel aligned vertical bus bars.

4. The junction box according to claim 1, wherein said fuse module is installed at one part of said base module case, said fuse module including a fuse attachment part to which a fuse is attached, and a fuse bus bar connected to a terminal of said fuse at one end, and directly connected at another end to said vertical bus bar via an orifice that penetrates the base module case.

5. The junction box according to claim 4, wherein said fuse module further comprises a terminal receiver for a terminal of a load side wire, wherein the terminal of said load side wire is connectable to a load side terminal of said fuse attached to said fuse attachment part, and wherein an input terminal of said fuse is connected to said vertical bus bar of said base module via said fuse bus bar.

6. The junction box according to claim 1, wherein said relay module is installed at one part of the base module case, said relay module including a relay attachment part to which a relay is attached, and a relay bus bar connectable to a terminal of said relay at one end, and directly connected at another end to said vertical bus bar via an orifice penetrating the base module case.

7. The junction box according to claim 6, wherein a part of said fuse bus bar connected to said fuse terminal of said fuse module extends toward said relay module and connects to an end of said relay bus bar to which said terminal of said relay of said relay module is connected.

8. The junction box according to claim 1, further comprising:

a terminal stopper provided in an inner surface of each terminal housing to lock said terminal connected to the external wire end when said terminal is inserted into the terminal housing.

9. The junction box according to claim 1, wherein each vertical bus bar is positioned in a groove that is aligned in the inner surface of said case, and each vertical bus bar is configured as at least one of single continuous bus bars and multiple bus bars aligned in series.

10. The junction box according to claim 1, wherein both longitudinal edges of said vertical bus bars are tapered.

11. The junction box according to claim 1, further comprising: an opening provided in said terminal housings of said case into which a retainer configured to provide a double stopper of said terminals is inserted.

12. The junction box according to claim 1, wherein an electronic control unit is housed inside said base module case, one end of a relay terminal connecting to a conductor of the electronic control unit, and another end of said relay terminal gripping one of said vertical bus bars and connecting thereto.

13. A junction box comprising:
  a base module including an upper case and a lower case;
  a plurality of generally rectangular plate-shaped bus bars positioned between said upper case and said lower case, and wherein said bus bars are spaced apart and vertically aligned such that upper and lower longitudinal edges of each said bus bar are positioned adjacent a respective one of said upper case and said lower case; and
  wherein an outer surface of at least one of said upper case and said lower case includes multiple terminal housings into which terminals connectable to external wire ends are insertable, said terminal housings being positioned adjacent selected ones of said bus bars so that terminal grip ends of inserted external wire terminals can grip and connect to said vertical bus bars; and
  at least one of a fuse module including a case and a fuse connection portion, and a relay module including a case and a relay connection portion said at least one of the fuse module and the relay module being connectable to said base module.

14. A junction box according to claim 13, further comprising at least one of a fuse module including a fuse connection circuit part and a relay module including a relay connection circuit part, and wherein said fuse connection circuit part and said relay connection circuit part are mountable on one of said upper case and said lower case and are configured to electrically connect to selected ones of said bus bars.

15. The junction box according to claim 14, wherein said terminal housings are aligned, and said one of said upper case and said lower case includes a retainer configured to provide a double stopper for a terminal inserted into said terminal housings.

16. The junction box according to claim 13, further comprising a terminal stopper provided in an inner surface of each terminal housing to lock a terminal connected to the external wire end, upon insertion of the terminal into the terminal housing.

17. The junction box according to claim 13, further comprising at least one slot provided in one of said upper case and said lower case into which said vertical bus bars are inserted.

18. The junction box according to claim 13, further comprising a connector receptacle that houses a terminal connected to the external wire terminal, wherein said connector is fitted into a connector receptacle provided in one of said upper case and said lower case, and one of said vertical bus bars is gripped by the pair of grip ends of the terminal inside the connector.

19. The junction box according to claim 13, further comprising a plurality of terminal housings on both said upper case and said lower case, and wherein wire terminals grip both longitudinal sides of said bus bars.

20. The junction box according to claim 13, wherein each bus bar is configured as at least one of single continuous bus bars and multiple bus bars aligned in series.

21. The junction box according to claim 13, wherein at least one longitudinal edge of each said bus bars is tapered.

22. The junction box according to claim 13, wherein both longitudinal edges of said vertical bus bars are tapered.

* * * * *